United States Patent Office 3,281,352
Patented Oct. 25, 1966

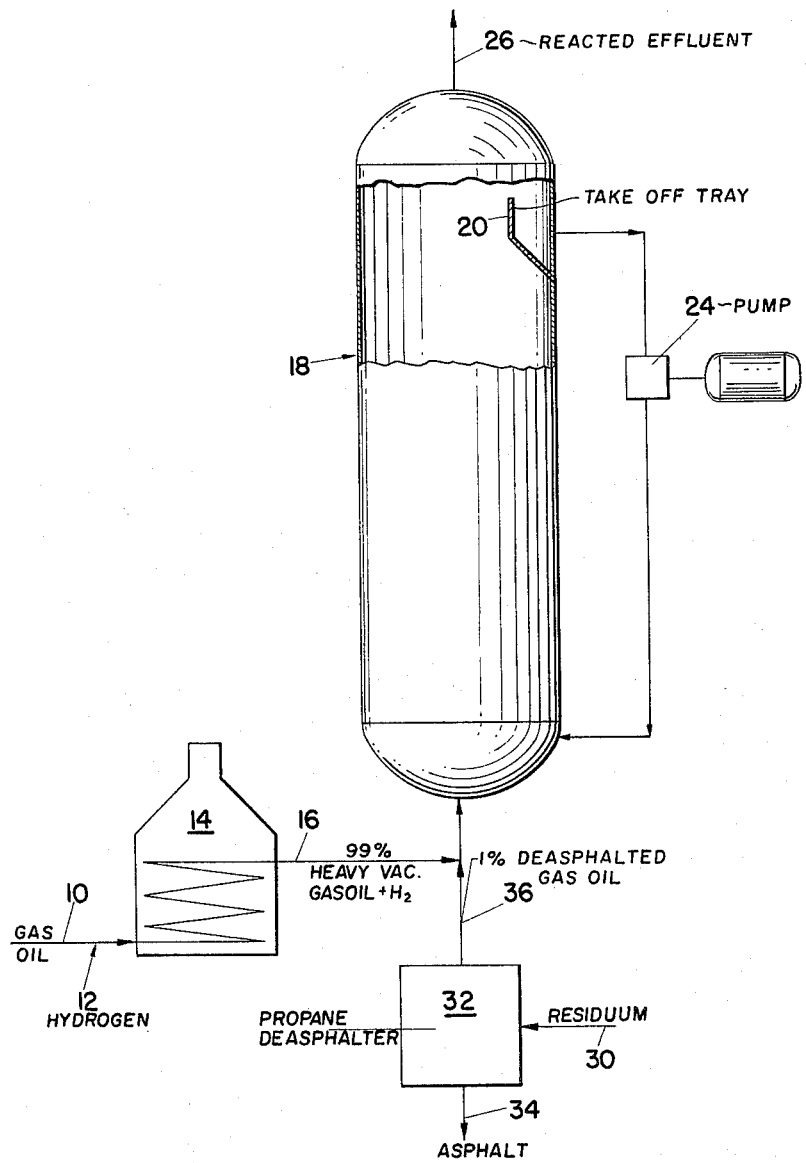

3,281,352
PROCESS FOR HYDROGENATION IN THE PRESENCE OF A HIGH BOILING OIL
Seymour C. Schuman, Princeton, N.J., assignor to Hydrocarbon Research, Inc., New York, N.Y., a corporation of New Jersey
Filed June 4, 1965, Ser. No. 465,827
4 Claims. (Cl. 208—143)

This is a continuation-in-part of my prior application, Serial No. 277,284, filed May 1, 1963, now abandoned.

This invention relates to improvements in the hydrogenation of petroleum oils, and is more particularly an improvement in the process described in my Patent No. 3,050,459, issued August 21, 1962, entitled "Two Stage Conversion of Heavy Oils."

The hydrogenation of petroleum oils as herein described includes the classical hydrodesulfurization, the relatively new hydrocracking and well known reactions for saturation, gum removal, etc. Furthermore, the invention pertains to a process of the type more particularly described in my prior patent in which the hydrogen and petroleum oil are passed upwardly through a reactor which may contain a mass of solids, catalytic or inert in character, under conditions to maintain a liquid phase and keep the particles in random motion. Customarily, a gaseous phase is removed from the effluent and more or less of the liquid is recycled to a lower part of the reactor to assure the desired degree of reaction.

It has been my experience that in the operation with relatively heavy oils having 10% or more by volume boiling above 900° F. contacting with the hydrogen at the desired temperature will not ordinarily eliminate all of the liquid with the result that a liquid effluent is present in the upper part of the reactor. Separation of the gaseous components from such effluent may be accomplished either within the reactor or in a separate vessel. Uniform temperatures are maintained due to top to bottom backmixing or external recycle, and a high degree of reaction is accomplished in a relatively small size reactor.

I have also observed that in processing different feed stocks and particularly heavy distillate gas oil to produce naphtha and furnace oil it becomes difficult if not impossible to operate in the above manner inasmuch as vaporization of the feed together with cracking may reduce the amount of liquid in the system below the minimum required to maintain the bed of catalyst in an expanded state. Thus it becomes substantially impossible to obtain the numerous commercial advantages as heretofore discussed in my prior patent.

Ordinarily, it is undesirable to introduce a diluent in a reaction system particularly where the diluent may have objectionable reactions which would interfere with the appropriate hydrogenation. However, I have found that by a particular selection of such a diluent I can continue to benefit by the liquid phase random motion hydrogenation reactions without objectionable side reactions.

The principal object of my invention is to extend the use of the liquid phase random motion or "ebullated" bed technique to process relatively lighter oil feed stocks and particularly those having no part boiling above 850° F.

Other objects and advantages of my invention will appear from the following description of a preferred form of embodiment thereof taken in connection with the attached drawing which is a schematic elevation with parts in section of hydrogenation reactor and associated parts.

As shown in the drawing, a charge of hydrocarbons such as heavy vacuum gas oil at 10 together with hydrogen at 12 is conveniently passed through a heater indicated at 14 and discharged at 16 to the reactor 18. Suitable distributing means, not shown, will permit a uniform upflow of the liquid and gas through the reactor, which is preferably filled with a mass of solids which may be inert or catalytic. Such solids will be of generally uniform size and may be of slurry size or less than 300 micron up to "ebullated" bed size of at least 60 microns and extending up to about 1/16" and usually not above 1/8" in major dimension.

With appropriate liquid feeds such as to expand the bed at least 10%, it is thus possible to obtain a nearly isothermal temperature profile even with the relatively large usage of hydrogen as in hydrocracking operations. A space velocity of from 0.2 to 30 v./hr./v. is usual. Hydrogen velocity is in the range of 1 to 40 s.c.f./lb. of charge and the superficial liquid velocity is from about one to one hundred twenty gallons per minute per square foot of horizontal cross section of the reaction zone.

As the oil and hydrogen pass upwardly through the mass a highly effective contact is obtained with the particles, thereby accomplishing a controlled hydrogenation of the desired type. Preferably the reactor is provided with a take off trap 20 from which a side stream 22 is removed and pumped through pump 24 into a lower part of the reactor to maintain suitable circulation. The reacted effluent is removed at 26 and may be treated to recover the hydrogen which may be recycled, and to fractionate out the desired end products.

With a hydrocarbon charge having a boiling range of 450–850° F. and operating under hydrogen pressures in the order of 500–5000 p.s.i.g., and at temperatures in the order of 500 to 950° F. such a fraction will tend to vaporize with or without cracking and thereby fail to continue the suspension of solids in liquid. This is highly undesirable in that it interferes with the efficient use of the apparatus.

In accordance with my invention, I add a refractory diluent oil to feed which may be a fraction of a residuum indicated at 30 suitably deasphalted as in propane deasphalter 32 from which the asphalt fraction is removed at 34. Deasphalted gas oil, removed overhead from the deasphalter 32 through line 36 is thus added to the heavy vacuum gas oil in line 14 and becomes part of the feed.

The boiling range of this diluent oil is such that preferably at least 10% boils above 900° F. Deasphalted gas oils may have 50% or even 100% of material boiling above 900° F.

The amount of deasphalted gas oil which may be added is preferably in the range of 1% to 5% of the total oil feed. Since the deasphalted gas oil is much higher boiling and more refractory than the hydrocarbon charge to be normally added, liquid is present both at the inlet and outlet of the reactor and it is then possible to maintain the catalyst in a state of random motion by the action of such liquid and obtain the benefits therefrom. By recycling such liquid as shown in the figure, through take-off trap 20 and using pump 24, a net liquid flow can be obtained in the reactor at any desired rate, provided any liquid whatsoever exists at the site of the take-off trap 20. Thus only a small quantity of the deasphalted gas oil need be added (corresponding to the 1 to 5% specified above), and the reactor capacity need not be enlarged significantly due to the use of such a small quantity of diluent oil.

By choosing a diluent oil of high quality, particularly those low in sulfur content and relatively free of asphaltenes and polycyclic aromatics, and correspondingly high in paraffins, the catalyst will not be adversely affected by contact with the heavier diluent oil, particularly since only a small quantity of diluent oil is employed.

As hereinbefore noted, this invention is primarily based on a feed (hydrocarbon charge stock) having no portion boiling above 850° F. and thus being a feed that will vaporize under the reaction conditions (500–850° F. and 500–5000 p.s.i.g.). By such vaporization, the solids are no longer carried in random motion in a liquid.

It will of course be appreciated that in operating under my Patent No. 3,050,459, with only 10% boiling over 950° F., it will be necessary, in using a continuous boiling fraction to add $20/80$ or 25% diluent. This unfavorably compares with the 1% to 5% found effective herein.

If a continuous boiling fraction, boiling to 900° F. is added, it is necessary to add $12/88$ or 13% diluent, as compared to the 1–5% limits mentioned above, and then there is no real certainty that there will be any liquid in the reactor.

Preferably, the solids within the reactor are catalytic. They may be mixtures of the oxides or sulfides of cobalt, molybdenum, nickel, tungsten, etc. supported on such bases as alumina, silica alumina, silica-magnesia or others.

While I have described and shown a preferred form of embodiment of my invention, I am aware that modifications may be made thereof and I, therefore, desire a broad interpretation of my invention within the scope and spirit herein and of the claims appended hereinafter.

I claim:

1. The process of hydrogenating a relatively low boiling petroleum oil having a boiling range of 450–850° F. under substantially isothermal conditions in a reaction zone in the presence of a hydrogenation catalyst, and under a hydrogen pressure of from 500 to 5000 p.s.i.g., and at a temperature in the range of 500 to 950° F. and with a hydrogen rich gas velocity upflow of 1 to 40 standard cubic feet per pound of the relatively low boiling petroleum oil, under which conditions the petroleum oil is by itself completely vaporized, which comprises adding less than 5% but a sufficient amount of a higher boiling refractory deasphalted gas oil to maintain an upflow liquid velocity in the range of 1 to 120 gallons per minute per square foot of horizontal cross section of the reaction zone to establish at least a 10% expansion of volume of the catalyst based on the settled volume thereof and accomplish random motion of the catalyst in the liquid without substantial carryover of the catalyst from the reaction zone, and recovering a liquid effluent from the upper part of the reaction zone.

2. The process as defined in claim 1 wherein the amount of deasphalted gas oil is from 1 to 5% of the feed oil.

3. The process as defined in claim 1 wherein the catalyst is from the class of oxides and sulfides of cobalt, molybdenum, nickel and tungsten and mixtures thereof, such catalyst being supported on a base from the class of alumina, silica-alumina, and silica-magnesia.

4. The process as defined in claim 3 wherein the catalyst is of from below 300 microns to about ⅛ inch in size.

References Cited by the Examiner

UNITED STATES PATENTS 3,050,459  8/1962  Schuman _____ 208—97

DELBERT E. GANTZ, *Primary Examiner.*

S. P. JONES, *Assistant Examiner.*